June 24, 1930.  A. ENGLAND  1,765,574
TEST GAUGE
Filed Oct. 18, 1928
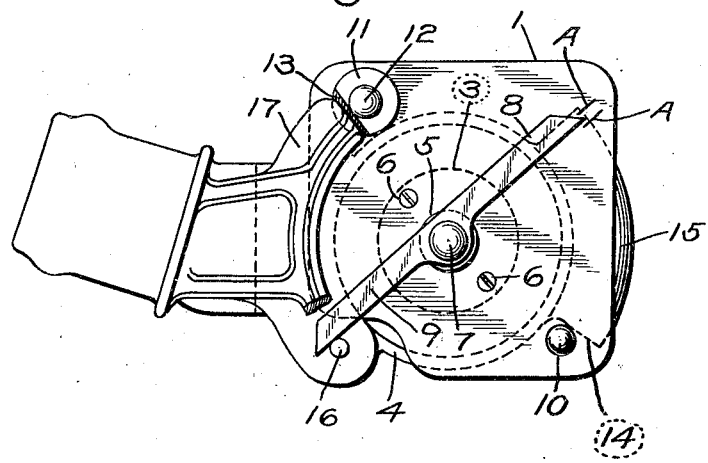
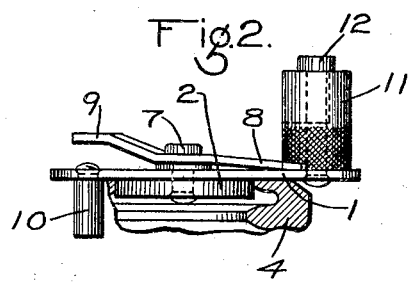
INVENTOR
ALEXANDER ENGLAND
BY
*Wm. N. Cady*
ATTORNEY Patented June 24, 1930

1,765,574

UNITED STATES PATENT OFFICE

ALEXANDER ENGLAND, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA

TEST GAUGE

Application filed October 18, 1928. Serial No. 313,224.

This invention relates to test gauges, and more particularly to a test gauge for hand operated hose couplings.

The principal object of my invention is to provide a test gauge for hose couplings to determine whether the spacing between the end of the locking flange and the guard arm flange is within predetermined limits and also the spacing between the end of the locking flange and the end of the guard arm.

In the accompanying drawing: Fig. 1 is a plan view of a hose coupling, showing my improved gauge applied thereto; and Fig. 2 a side elevation of the gauge.

The gauge may comprise a substantially rectangular metal plate 1 having applied to one side a circular boss 2 of hardened steel which is adapted to fit nicely in the outlet opening 3 of the hose coupling 4, the boss having a reduced circular section 5 which fits in a corresponding opening in the plate 1, the boss being secured to the plate by means of screws 6.

A rotatable member is mounted on a pivot pin 7, extending centrally through the boss 2 and comprises an indicating arm 8 and a gauge arm 9.

A pin 10 is secured to the plate 1, preferably by riveting and a rotatable member 11 is mounted on the plate, on a pin 12 secured to said plate. The member 11 is provided with a flat portion 13.

To use the gauge, the plate 1 is applied to the face of the hose coupling, with the boss 2 engaging in the outlet opening 3 of the coupling head. The plate is then rotated until the pin 10 engages the end shoulder 14 of the locking flange 15 of the coupling head.

The arm 9 is next rotated until it engages the guard arm pin 16. Radial lines A—A are marked on the plate 1, and determine the limits which may be tolerated. If the edge of the arm 8 lies between the lines A—A, then the spacing between the pin 16 and the shoulder 14 is acceptable. If the edge of arm 8 falls without the lines A—A, the hose coupling should be rejected.

With the pin 10 in engagement with the shoulder 14, the maximum length of the guard arm is determined by the flat portion 13. The end of the guard arm 17 must enter at the flat portion, otherwise, the guard arm is too long and requires rejection. The minimum length is determined by the rounded portion of the member 11. If the rounded portion will enter, with the pin 10 in engagement with the shoulder 14, then the guard arm is too short and requires rejection of the coupling head.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A gauge for testing a hose coupling having a guard arm pin and a locking flange comprising a plate provided with a portion engaging the outlet conduit opening of the coupling head and having indicating marks, a pin adapted to engage the shoulder end of the locking flange of the coupling head and a movable member mounted on said plate having a portion adapted to be moved into engagement with the guard arm pin and a portion for indicating by relation to said marks the position of engagement.

2. A gauge for testing a hose coupling having a guard arm and a locking flange comprising a plate provided with a portion engaging the outlet conduit opening of the coupling head, a pin adapted to engage the shoulder end of the locking flange of the coupling head and a movable member mounted on said plate and movable to one position for determining whether the length of the guard arm exceeds a maximum and to another position for determining whether the length of the guard arm is less than a minimum.

3. A gauge for a hose coupling having a guard arm pin and a locking flange and adapted to test whether the angular distance between the shoulder of the locking flange of the coupling and the guard arm pin falls within predetermined limits comprising a member adapted to be applied to the hose coupling and having a pin adapted to engage the shoulder of the locking flange, an element movably mounted on said member and movable to engage with said pin, and means for indicating the position of said element.

4. A gauge for testing a hose coupling having a guard arm and a locking flange and adapted to test whether the angular distance between the shoulder of the locking flange of the coupling and the end of the guard arm falls within predetermined limits comprising a member adapted to be applied to the hose coupling and having a pin adapted to engage the shoulder of the locking flange, an element movably mounted on said member and having gauging faces, the relation of which to the end of the guard arm indicates said limits.

In testimony whereof I have hereunto set my hand, this 15th day of October, 1928.

ALEXANDER ENGLAND.